Patented Nov. 14, 1933

1,935,362

UNITED STATES PATENT OFFICE 1,935,362

NONMETALLIC PERMANENT MOLD

Harry P. Kimber, Detroit, Mich., assignor, by mesne assignments, to Erb-Joyce Foundry Company, Detroit, Mich., a corporation of Michigan No Drawing. Application November 20, 1931
Serial No. 576,422

6 Claims. (Cl. 22—188)

This invention relates to the production of a non-metallic permanent mold.

The object of this invention is to make a mold which will stand repeated use in an iron foundry. The problem has been to get a material for a mold which has less conductivity than cast iron but more conductivity than ordinary sand molds. Unless the conductivity is higher than ordinary sand molds the temperature gradient will be so high that the temperature of the surface of the mold will differ so greatly from the temperature of the mold immediately beneath the surface that these parts of the mold will part company. In other words the mold cracks.

The objection to the use of iron molds is that the conductivity is so high that it is necessary to anneal the casting if they are to be machined at high cutting speeds.

The following composition of matter has been found to give a satisfactory mold, especially if you use a coating such as is described in the patents to Meloche, Nos. 1,560,838; 1,492,694; and 1,453,593, and the method of applying the coating described in Meloche Patent No. 1,506,130, namely, the repeated washing of the heated mold by a dilute solution of sodium silicate and water, and fire clay in suspension lengthens the life of the mold and improves the appearance of the casting.

The materials which I have found most desirable are: chrome ore mixed with fused silica and bentonite. The latter is a superior grade of fire clay. The specific proportions I have used have been: Three parts, by weight, of chrome ore, one part of fused silica, one part of bentonite, mixed with one part of water.

Almost as good results were obtained with the following proportions:

| | Parts |
|---|---|
| Chrome ore | Two |
| Fused silica | Two |
| Bentonite | One |
| Water | One |

These are parts by weight.

The extreme range of mixtures used in which I have found material suitable for these molds are as follows:

| | Parts |
|---|---|
| (1) Chrome ore | Four |
| Fused silica | Zero |
| Bentonite | One |
| Water | One |
| (2) Chrome ore | Zero |
| Fused silica | Four |
| Bentonite | One |
| Water | One |

The ingredients of this mixture are first finely ground, mixed with water and rammed into any desired shape, usually in an iron container. The mold is slowly brought up to temperature and heated for some hours at a temperature higher than that which the mold will reach in use, which is about 1800° F. The surface of the mold is then checked for dimensions and if necessary irregularities are removed with a small dental grinding tool. The surface of the mold is then protected with the Meloche coating referred to above, and finally a relatively thick coating of lamp black is applied before each casting and the surface of the mold is blown after each casting, and the coating of lamp black is renewed after the casting is made as set forth in the Meloche patents referred to above. The ingredients employed are selected so that the molding material after being baked has the property of conducting heat away from castings formed therein at a rate less than that of cast iron and greater than the rate at which sand would conduct heat from the casting. The finished mold has a smooth, hard surface not easily washed by the action of most metals and the molds contract and expand at approximately the same rate as the metals cast therein.

I have recently discovered that if in place of ordinary fire clay I substitute bentonite for the fire clay, and if I substitute an acid for an alkali liquid in which to support the suspensions, I get a more uniform distribution of the particles in the wash and improve the coating thereby. However the ordinary Meloche coating has proven quite satisfactory.

What I claim is:

1. A non-metallic permanent mold composed of three parts of chrome ore, by weight, one part of fused silica and one part of bentonite.

2. A non-metallic permanent mold composed of two parts, by weight, of chrome ore, two parts of fused silica and one part of bentonite.

3. A non-metallic permanent mold composed of four parts, by weight, of a mixture of chrome ore and fused silica and one part of bentonite.

4. The method of making a non-metallic permanent mold comprising mixing together ground chrome ore, fused silica and bentonite, mixing with a small quantity of water ramming into a form and finally baking in an oven.

5. A non-metallic permanent mold composed of one part, by weight, bentonite and from one to four parts of a material selected from a class consisting of chrome ore and fused silica.

6. A non-metallic permanent mold composed of a mixture containing substantial proportions of chrome ore, fused silica and bentonite, protected by a smooth adherent inert refractory heat insulating outer coating.

HARRY P. KIMBER.